US 9,359,918 B2

(12) United States Patent
Emani et al.

(10) Patent No.: US 9,359,918 B2
(45) Date of Patent: Jun. 7, 2016

(54) APPARATUS FOR REDUCING EMISSIONS AND METHOD OF ASSEMBLY (75) Inventors: Satyanarayana V R Emani, Kakinada (IN); Gilbert Otto Kraemer, Greer, SC (US); Hua Zhang, Greer, SC (US); Rajashekhar Pendyala, Hyderabad (IN); Jitendra Harish Bijlani, Karnataka (IN)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 12/915,576

(22) Filed: Oct. 29, 2010

(65) Prior Publication Data
US 2012/0102913 A1 May 3, 2012

(51) Int. Cl.
| F01K 17/02 | (2006.01) |
| F01K 23/10 | (2006.01) |
| F01K 17/06 | (2006.01) |
| F01N 5/02 | (2006.01) |

(52) U.S. Cl.
CPC ............... *F01K 23/10* (2013.01); *F01K 17/02* (2013.01); *F01K 17/06* (2013.01); *F01N 5/02* (2013.01); *Y02E 20/16* (2013.01)

(58) Field of Classification Search
CPC ......... F01K 17/02; F01K 23/10; F01K 17/06; Y02E 20/16; F01N 5/02
USPC ......... 60/39.182, 39.181, 39.52, 39.5, 39.511
See application file for complete search history.

(56) References Cited

U.S. PATENT DOCUMENTS

| 2,076,287 | A | * | 4/1937 | Arnold ..................... 237/12.3 B |
| 4,353,206 | A | | 10/1982 | Lee |
| 5,044,152 | A | | 9/1991 | Hoizumi et al. |
| 5,155,995 | A | | 10/1992 | Kinnear et al. |
| 5,555,849 | A | | 9/1996 | Wiechard et al. |
| 5,824,273 | A | * | 10/1998 | Tatani et al. .................. 422/171 |
| 6,055,803 | A | * | 5/2000 | Mastronarde .................. 60/783 |
| 6,235,254 | B1 | | 5/2001 | Murphy et al. |

(Continued)

FOREIGN PATENT DOCUMENTS

| CN | 1192190 A | 9/1996 |
| CN | 1147288 A | 4/1997 |

(Continued)

OTHER PUBLICATIONS

Search Report and Written Opinion from FR Application No. 1159673 dated Apr. 19, 2013.

(Continued)

*Primary Examiner* — Mary A Davis
(74) *Attorney, Agent, or Firm* — Armstrong Teasdale LLP (57) ABSTRACT A heat recovery steam generator (HRSG) is coupled to a gas turbine engine that discharges a flow of exhaust gases including oxides of nitrogen ($NO_x$). The HRSG includes a steam-based heating element for heating the exhaust gases, and at least one $NO_x$ reduction element coupled downstream from the at least one steam-based heating element and configured to facilitate reducing an amount of $NO_x$ in the exhaust gases that are channeled into the at least one $NO_x$ reduction element.

18 Claims, 5 Drawing Sheets (56) References Cited

U.S. PATENT DOCUMENTS

| | | | |
|---|---|---|---|
| 6,415,601 B1* | 7/2002 | Glugla et al. | 60/284 |
| 6,609,483 B1* | 8/2003 | Albrecht et al. | 122/479.2 |
| 7,578,265 B2 | 8/2009 | Albrecht | |
| 8,061,125 B2* | 11/2011 | Yoshida et al. | 60/286 |
| 8,186,142 B2* | 5/2012 | Narayan et al. | 60/39.182 |
| 2001/0032458 A1* | 10/2001 | Suzuki et al. | 60/288 |
| 2006/0228283 A1* | 10/2006 | Malyala et al. | 423/239.1 |
| 2008/0229758 A1* | 9/2008 | Lin et al. | 62/3.2 |
| 2010/0215558 A1 | 8/2010 | Kraemer | |

FOREIGN PATENT DOCUMENTS

| | | |
|---|---|---|
| FR | 2631382 A1 | 11/1989 |
| GB | 2358440 A | 7/2001 |
| JP | 60098112 A | 6/1985 |
| JP | H01155007 A | 6/1989 |
| JP | H048088 B2 | 2/1992 |
| JP | H04342805 A | 11/1992 |
| JP | 11280413 A | 10/1999 |
| JP | 2004019484 A | 1/2004 |
| WO | 9523915 A1 | 9/1995 |
| WO | 9705057 A1 | 2/1997 |

OTHER PUBLICATIONS

Unofficial English Translation of Chinese Office Action issued in connection with corresponding CN Application No. 201110344850.X on Nov. 18, 2014.

Unofficial English Translation of Japanese Office Action issued in connection with corresponding JP Application No. 2011-234472 on Sep. 1, 2015.

\* cited by examiner

APPARATUS FOR REDUCING EMISSIONS AND METHOD OF ASSEMBLY

BACKGROUND OF THE INVENTION

The embodiments described herein relate generally to emissions treatment systems and, more particularly, to an apparatus for use in reducing $NO_2$ formation in the exhaust path of a combustion system.

During the combustion of natural gas and liquid fuels, pollutants such as, but not limited to, carbon monoxide (CO), unburned hydrocarbons (UHC), and oxides of nitrogen ($NO_x$) emissions, may be formed and/or emitted into an ambient atmosphere. In general, CO and UHC may be formed during combustion conditions at lower temperatures and/or during combustion conditions when an insufficient amount of time to complete a reaction is available. In contrast, $NO_x$ is generally formed during combustion conditions at higher temperatures. At least some known pollutant emission sources include industrial boilers and furnaces, reciprocating engines, gas turbine engines, and/or steam generators.

Modern air quality regulations increasingly mandate reduced emission levels for power generation plants, while also requiring increased fuel efficiency requirements. To comply with stringent emission control standards, it is desirable to control $NO_x$ emissions by suppressing the formation of $NO_x$ emissions. Oxides of nitrogen include nitric oxide (NO) and nitrogen dioxide ($NO_2$), which is known to produce a visible yellow plume from exhaust stacks and that is alleged to contribute to the creation of "acid rain." However, known combustion controls may provide only limited emissions control and may prove inadequate in satisfying the increased standards and the often-conflicting goals, such that further improvements of post-combustion exhaust gas treatment systems are desirable.

One known technology for use in controlling $NO_x$ in stack emissions is selective catalytic reduction (SCR). In an SCR system, flue gases from power generation plants often have a net oxidizing effect due to a high proportion of oxygen that is provided to ensure adequate combustion of a hydrocarbon fuel. Thus, $NO_x$ that is present in the flue gas may be reduced to nitrogen and water with great difficulty. An SCR element may be used to mix anhydrous ammonia with the flue gas, and the gases are channeled over a suitable reduction catalyst at a suitable temperature prior to being released into the atmosphere. However, the reaction rate over the catalyst is dependent on the inlet gas temperature as such the rate of $NO_x$ destruction is insufficient until the flue gas is heated to the suitable temperature. Accordingly, during transient phases, such as during startup operations, the SCR element generally does not reduce the $NO_x$ to a desired level as the flue gas temperature is to low.

BRIEF DESCRIPTION OF THE INVENTION

In one aspect, a method is provided for providing a heat recovery steam generator (HRSG) for use with a gas turbine engine. The method includes providing an HRSG, coupling a steam-based heating element within the HRSG, and coupling at least one oxides of nitrogen ($NO_x$) reduction element downstream from the steam-based heating element, wherein the steam-based heating element is configured to operate during gas turbine engine operations with insufficient exhaust temperatures for desired $NO_x$ reduction to increase a temperature of exhaust gases routed through the at least one $NO_x$ reduction element to enable the at least one $NO_x$ reduction element to facilitate $NO_x$ reduction reactions during the gas turbine engine operations.

In another aspect, a heat recovery steam generator (HRSG) is provided, wherein the HRSG is coupled to a gas turbine engine that discharges a flow of exhaust gases including oxides of nitrogen ($NO_x$). The HRSG includes a steam-based heating element for heating the exhaust gases, and at least one $NO_x$ reduction element coupled downstream from the at least one steam-based heating element and configured to facilitate reducing an amount of $NO_x$ in the exhaust gases that are channeled into the at least one $NO_x$ reduction element.

In another aspect, a combined cycle power plant is provided, including a gas turbine engine and a heat recovery steam generator (HRSG) coupled in flow communication with the gas turbine engine. The gas turbine engine is configured to combust a fuel in air to produce shaft power and a flow of exhaust gases including oxides of nitrogen ($NO_x$). The HRSG includes a steam-based heating element for heating the exhaust gases, and at least one $NO_x$ reduction element coupled downstream from the steam-based heating element and configured to facilitate reducing an amount of $NO_x$ in the exhaust gases channeled into the at least one NO reduction element.

DETAILED DESCRIPTION OF THE INVENTION

Exemplary embodiments of methods and apparatus for use in reducing $NO_2$ formation in the exhaust path of a combustion system are described herein. More specifically, the embodiments described herein facilitate improving $NO_x$ conversion using a selective catalytic reduction (SCR) catalyst during startup, shutdown, and low-load operations of a gas turbine engine. Existing SCR catalysts that may be used with heat recovery steam generators (HRSG) such as those described herein, are typically honeycomb structures formed from a ceramic material and coated with a catalyst material. Conversion of $NO_x$ begins when the surface temperature of the catalyst is sufficiently hot, such as above approximately 400° F. During startup operations of the gas turbine engine, $NO_x$ emissions are higher than during base-load operation. Accordingly, SCR catalyst conversion efficiency during startup operations is lower because the SCR catalyst has not reached a sufficient temperature. Frequently, ammonia is injected into a flowpath of exhaust gases from the gas turbine engine to further enhance $NO_x$ reduction, based on the temperature of the SCR catalyst. Embodiments of the invention facilitate increasing the catalyst surface temperature with a steam-based heat element, such as a panel of superconducting heat transfer tubes, near the SCR catalyst. The exhaust gases from the gas turbine engine are heated by the heat element before entering the SCR catalyst such that the catalyst reaches a desired temperature.

Figure 1:
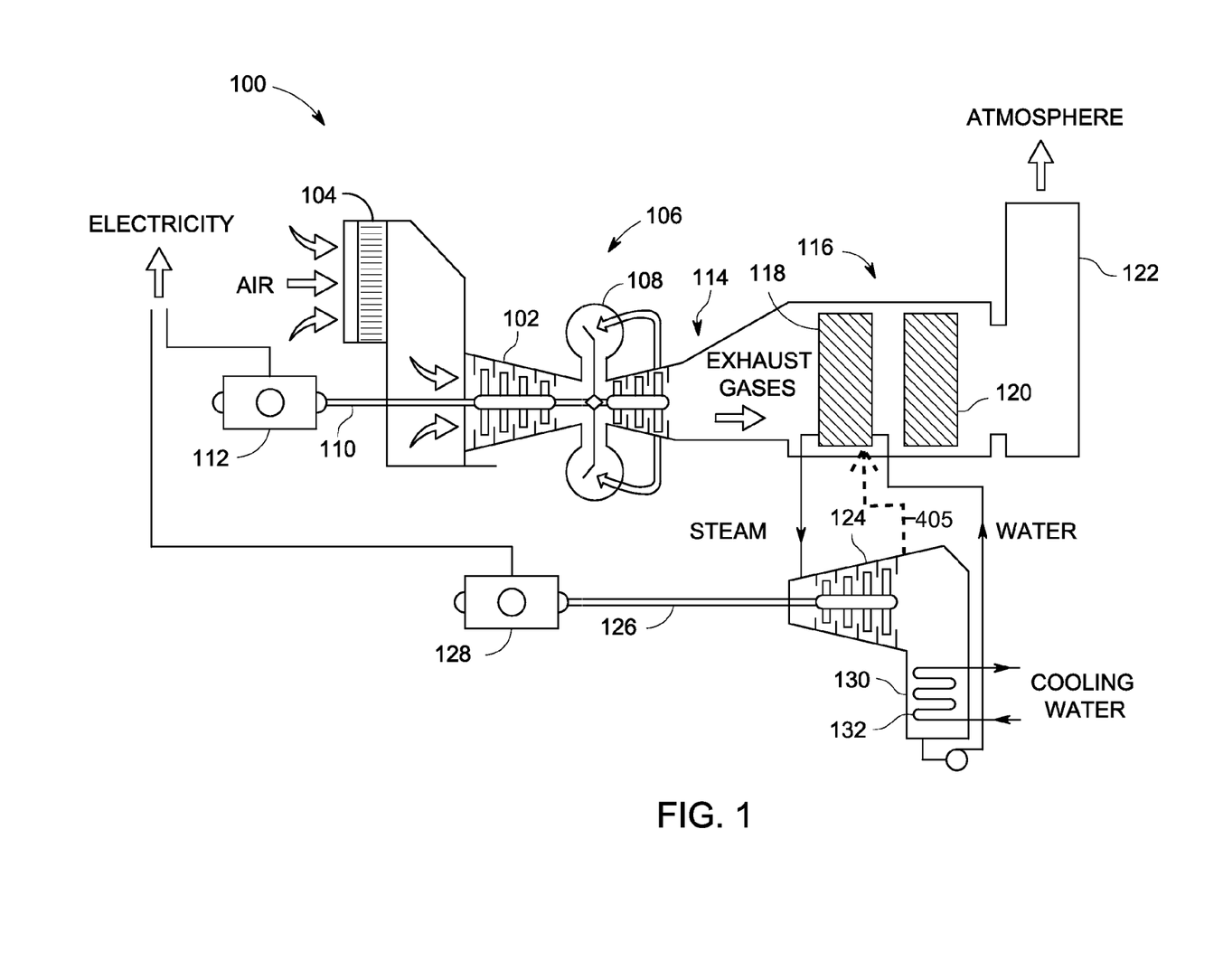
FIG. 1 is a simplified schematic diagram of an exemplary combined cycle power plant.

FIG. 1 is a simplified schematic diagram of an exemplary combined cycle power plant 100. In the exemplary embodiment, power plant 100 includes a gas turbine engine 106 having a compressor 102 that receives air from an air intake 104. Compressor 102 is coupled to one or more combustion chambers 108. Compressor 102 compresses air received via air intake 104 and channels the compressed air into combustion chambers 108, wherein the compressed air is mixed with fuel and ignited to supply hot combustion gases for driving a first shaft 110. First shaft 110 is coupled to a first generator 112, and causes first generator 112 to generate electricity. Moreover, gas turbine engine 106 discharges exhaust gases into an exhaust duct 114, including, for example and not by way of limitation, oxides of nitrogen ($NO_x$), carbon monoxide (CO), and unburned hydrocarbons.

In the exemplary embodiment, power plant 100 also includes a heat recovery steam generator (HRSG) 116 that is coupled in flow communication to gas turbine engine 106. Specifically, HRSG 116 is coupled to gas turbine engine 106 via exhaust duct 114 such that HRSG 116 receives the exhaust gases discharged from gas turbine engine 106. In the exemplary embodiment, HRSG 116 includes one or more heat exchangers 118 and emissions treatment equipment 120. Heat exchangers 118 extract heat from the exhaust gases, and the heat is used to generate steam. Emissions treatment equipment 120 processes the exhaust gases, and the processed exhaust gases are subsequently released to the atmosphere via an exhaust stack 122.

A steam turbine 124 is coupled to HRSG 116 such that steam generated by heat exchangers 118 is channeled into steam turbine 124 for use in driving rotation of a second shaft 126. Second shaft 126 is also coupled to a second generator 128, and causes second generator 128 to generate electricity. The spent steam is then channeled into a condenser 130 that includes a plurality of tube bundles 132. Cooling water channeled through tube bundles 132 cools the steam such that the steam condenses into water. The water is then channeled back to heat exchangers 118. One embodiment includes a path 405 (shown as a dotted line) of steam from the steam turbine 124 going back to the HRSG 116 in order to heat exhaust gases by the steam-based heating element.

Figure 2:
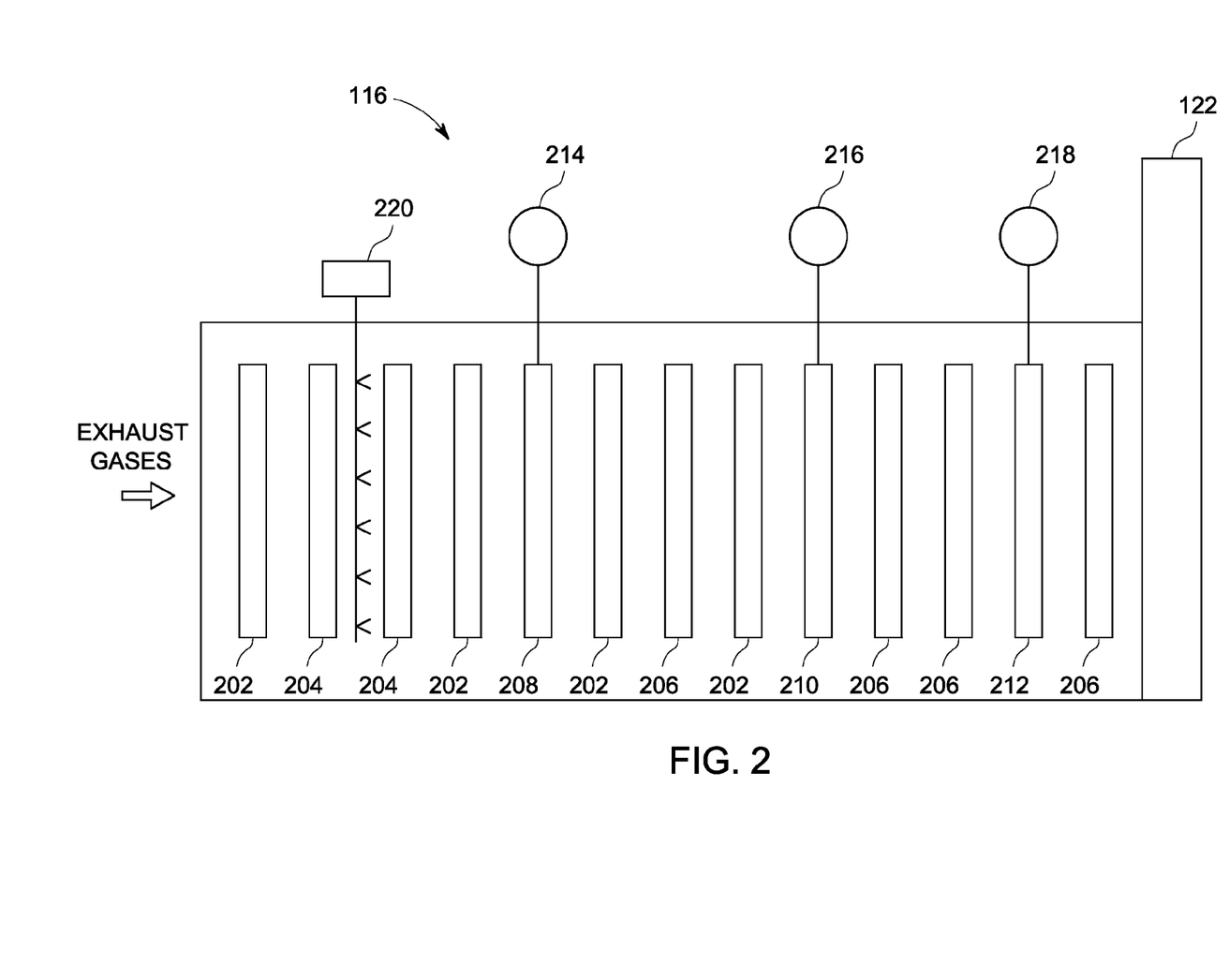
FIG. 2 is a block schematic diagram of an exemplary heat recovery steam generator (HRSG) that may be used with the combined cycle power plant shown in FIG. 1.

FIG. 2 is a block schematic diagram of HRSG 116. In the exemplary embodiment, HRSG 116 receives a flow of exhaust gases discharged from gas turbine engine 106 (shown in FIG. 1) via exhaust duct 114 (shown in FIG. 1). Moreover, in the exemplary embodiment, heat exchangers 118 include a plurality of superheater heat exchangers 202, a plurality of reheater heat exchangers 204, and a plurality of economizer heat exchangers 206. HRSG 116 also includes a high pressure evaporator 208, an intermediate pressure evaporator 210, and a low pressure evaporator 212 that each produce steam using the heat contained in the exhaust gases. Each evaporator 208, 210, and 212 is coupled to a respective pressure drum. In the exemplary embodiment, high pressure evaporator 208 is coupled to a high pressure drum 214, intermediate pressure evaporator 210 is coupled to an intermediate pressure drum 216, and low pressure evaporator 212 is coupled to a low pressure drum 218. HRSG 116 also includes at least one duct burner 220 that supplies heat into the exhaust gas flow to enhance steam production output. Accordingly, in the exemplary embodiment, HRSG 116 generates steam at a plurality of different pressures using high pressure drum 214, intermediate pressure drum 216, and low pressure drum 218. Moreover, in the exemplary embodiment, each pressure drum 214, 216, and 218 routes the pressurized steam to a different steam turbine (not shown). In an alternative embodiment, each pressure drum 214, 216, and 218 channels the pressurized steam to a single steam turbine, such as steam turbine 124 (shown in FIG. 1). In the exemplary embodiment, emissions treatment equipment 120 (shown in FIG. 1) is coupled among heat exchangers 202, 204, and 206, evaporators 208, 210, and 212, and duct burner 220 to facilitate reducing an amount of contaminants entrained within the flow of exhaust gases. In an alternative embodiment, emissions treatment equipment 120 is positioned in the flow of exhaust gases downstream from heat exchangers 118.

Figure 3:
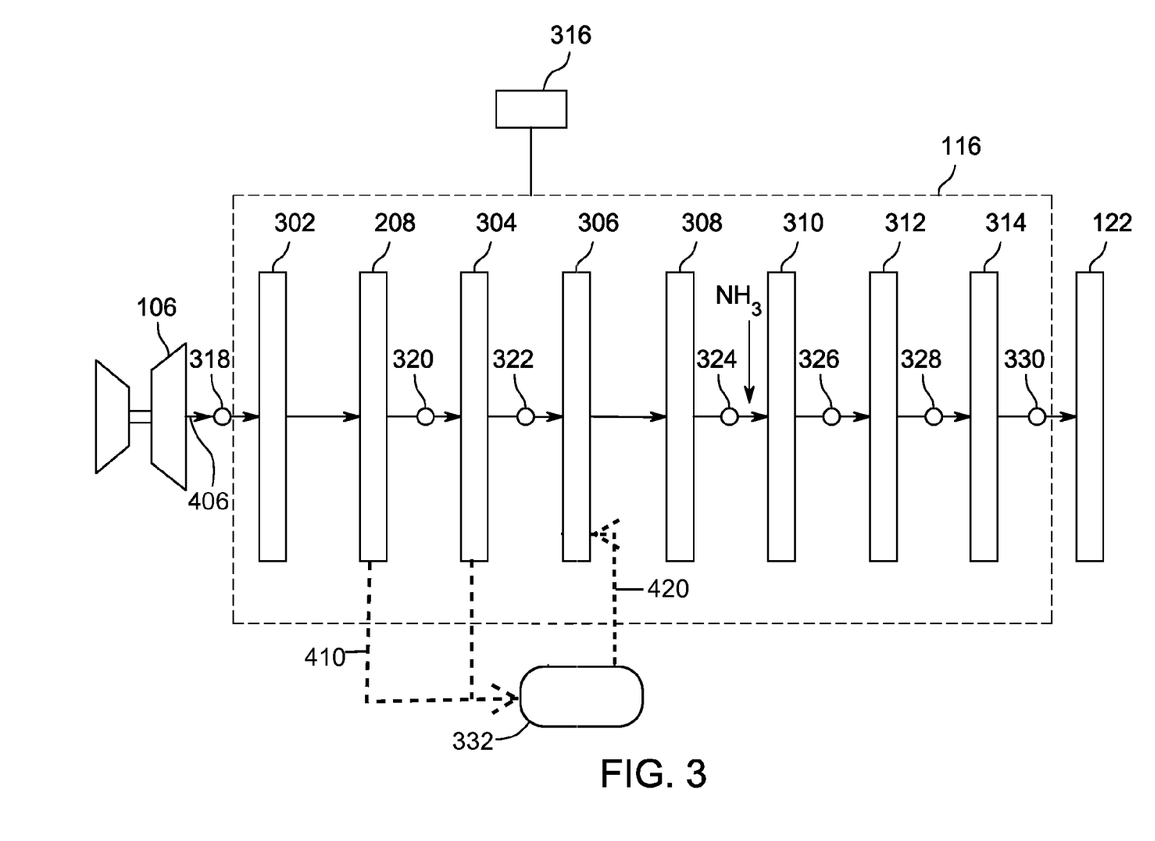
FIG. 3 is a simplified block diagram for the HRSG shown in FIG. 2.

FIG. 3 is a simplified block diagram for HRSG 116. As shown in FIG. 3, HRSG 116 includes a duct burner 302 that elevates a temperature of the exhaust gases after the exhaust gases have been discharged from gas turbine engine 106 via exhaust duct 114 (shown in FIG. 1). High pressure evaporator 208 is coupled in flow communication downstream from duct burner 302, and also raises the temperature of the exhaust gases. For example, in one embodiment, duct burner 302 and high pressure evaporator 208 receive the exhaust gases at a temperature of approximately 700° Fahrenheit (° F.). In the example, the exhaust gases include approximately 90 parts per million (ppm) of $NO_x$, which includes approximately 10% nitrogen dioxide ($NO_2$), and duct burner 302 and high pressure evaporator 208 heat the exhaust gases to a temperature above approximately 700° F. Moreover, in the exemplary embodiment, a high pressure heat exchanger 304 is coupled in flow communication downstream from high pressure evaporator 208 to facilitate cooling the exhaust gases to approximately 400° F.

In the exemplary embodiment, a steam-based heating element 306 is coupled in flow communication downstream from high pressure heat exchanger 304 to selectively increase the temperature of the exhaust gases to facilitate reducing the concentration of, for example $NO_x$, in emissions channeled to stack 122. More specifically, in one embodiment, heating element 306 heats the exhaust gases to a temperature of between approximately 500° F. and approximately 800° F. In the exemplary embodiment, a carbon monoxide (CO) catalyst 308 is coupled in flow communication downstream from heating element 306 to facilitate oxidizing the nitric oxide (NO) to equilibrium concentrations of $NO_2$ at local exhaust temperatures at the location of CO catalyst 308 in the exhaust gas stream. Specifically, CO catalyst 308 oxidizes NO such that the exhaust gases include approximately 90 ppm $NO_x$, which includes less than approximately 50% $NO_2$, but is SCR catalyst dependent.

In the exemplary embodiment, an injection apparatus 310 is coupled in flow communication downstream from CO catalyst 308. Injection apparatus 310 injects a reducing agent into the flow of exhaust gases to facilitate reducing the concentration of $NO_x$ within the exhaust gases. Moreover, in the exemplary embodiment, a $NO_x$ reduction element 312 is coupled in flow communication downstream from injection apparatus 310. $NO_x$ reduction element 312 channels the exhaust gases, including the reducing agent, over a suitable reduction catalyst to facilitate reducing the concentration of $NO_x$. For example, the reduction catalyst provides an environment suitable for the reduction of $NO_x$, by 120 ppm of $NH_3$, to predominantly $NO_2$, such as approximately 80% $NO_2$. For example, in the exemplary embodiment, $NO_x$ reduction element 312 channels the exhaust gases over the reduction catalyst at a temperature between approximately 500° F. and 800° F., wherein $NO_x$ reduction element 312 reduces the $NO_x$ to a concentration of approximately 9 ppm, which includes approximately 90% of $NO_x$ as $NO_2$ and 5 ppm $NH_3$.

In one embodiment, injection apparatus 310 is an ammonia (NH$_3$) injection grid that is coupled in flow communication downstream from CO catalyst 308. NH$_3$ injection grid 310 injects ammonia into the flow of exhaust gases to facilitate reducing the concentration of NO$_x$ within the exhaust gases. Specifically, NH$_3$ injection grid 310 injects a gaseous ammonia mixture into the flow of exhaust gases such that a concentration of ammonia is reduced to approximately 120 ppm. In an alternative embodiment, injection apparatus 310 injects a reducing agent such as hydrogen, or an organic reducing agent, such as a hydrocarbon material, into the flow of exhaust gases.

Moreover, NO$_x$ reduction element 312 channels the exhaust gases over a suitable reduction catalyst at a temperature between approximately 500° F. and 800° F. to facilitate reducing the concentration of NO$_x$. In one embodiment, NO$_x$ reduction element 312 uses an organic reducing agent, such as a hydrocarbon material, to reduce the concentration of NO$_x$. For example, in one embodiment, NO$_x$ reduction element 312 includes one or more catalysts provided in one or more catalyst zones. The exhaust gases, including the organic reducing agent, are routed through each catalyst zone to interact with the corresponding catalyst. Exemplary catalysts include, but are not limited to only including, a zeolite material, a catalytic metal such as platinum group metals, gallium, and/or a promoting metal such as silver, gold, vanadium, zinc, titanium, tin, bismuth, cobalt, molybdenum, tungsten, indium, and mixtures thereof. In an alternative embodiment, NO$_x$ reduction element 312 uses a hydrogen-based reducing agent, such as H$_2$. Typically, the precious metal catalysts used in NO$_x$ reduction element 312 having H$_2$ or hydrocarbon as a reducing agent require lower temperatures for the same NO$_x$ removal efficiency as NO$_x$ reduction element 312 having ammonia as the reducing agent. However, use of H$_2$ or a hydrocarbon reducing agent enables a lower maximum temperature before degrading or oxidizing ammonia to NO$_x$ or both. Accordingly, in some embodiments, the precious metal catalysts are located closer to the exhaust of HRSG 116 in a lower temperature operating environment.

In another alternative embodiment, NO$_x$ reduction element 312 uses a 3-way catalyst, such as a dry 3-way catalyst. Exemplary 3-way catalysts include one or more platinum group metals that are dispersed on a base with a well-developed surface of stable oxides, together with oxides of zirconium or cerium and one or more oxides of the alkaline-earth metals barium, calcium, and strontium. The catalyst base may be coated onto a carrier such as a ceramic block or a spirally wound metal foil composed of iron, chromium, and aluminum, or onto corrosion-resisting materials on an iron base. In addition to platinum group metals, 3-way catalysts that contain one or more oxides of d-elements tend to increase the efficiency of platinum group catalysts by maintaining oxygen availability through the convertible accumulation of oxygen during the cycle and by suppressing the generation of toxic gases such as hydrogen sulfide and ammonia. The above examples of 3-way catalysts are for exemplary purposes only and are not meant to limit the types of 3-way catalysts that may be used in NO$_x$ reduction element 312.

Furthermore, in the exemplary embodiment, HRSG 116 includes a low pressure heat exchanger 314 coupled in flow communication downstream from NO$_x$ reduction element 312. Moreover, in the exemplary embodiment, low pressure heat exchanger 314 cools the exhaust gases to a temperature of approximately 150° F. including approximately 9 ppm NO$_x$ and 5 ppm NH$_3$.

In the exemplary embodiment, a controller 316 is coupled to, for example, HRSG 116. Controller 316 controls activation and/or performance of heating element 306. For example, during a startup of combined cycle power plant 100 (shown in FIG. 1), controller 316 activates heating element 306 to heat the flow of exhaust gases to facilitate reducing NO$_x$ to, for example, NO and NO$_2$, prior to the exhaust gases being released into the atmosphere via stack 122. The startup of plant 100 may be any of a hot start, a warm start, or a cold start. Heating element 306 can operate during the purge stage of gas turbine startup. In some embodiments, controller 316 causes heating element 306 to heat the flow of exhaust gases during any transient operational phase or load or low speed, to facilitate an increased reduction of NO$_x$ by heating the exhaust gases to a temperature sufficient for NO$_x$ reduction to the desired emission level. In the exemplary embodiment, controller 316 is communicatively coupled to a plurality of temperature sensors 318, 320, 322, 324, 326, 328, and 330 to facilitate sensing the change in temperature of exhaust gases flowing across HRSG 116.

Figure 4:
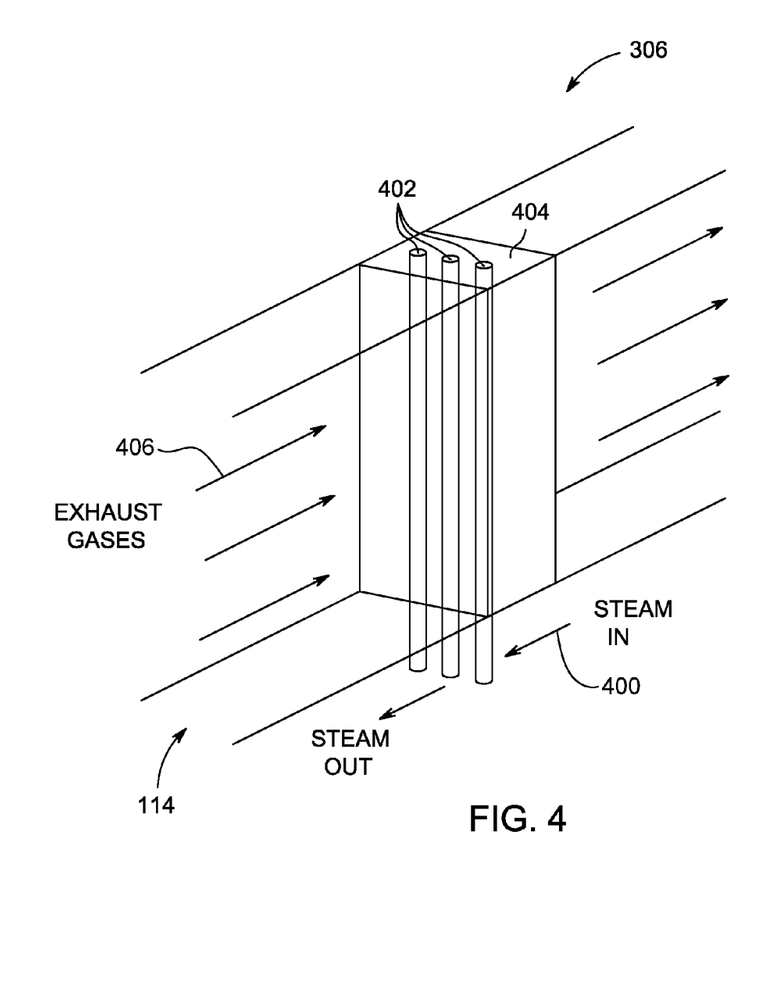
FIG. 4 is a perspective view of an exemplary steam-based heating element that may be used with the HRSG shown in FIGS. 2 and 3.

FIG. 4 is a perspective view of an exemplary steam-based heating element 306 that may be used with HRSG 116 (shown in FIGS. 2 and 3). In the exemplary embodiment, and as shown in FIG. 4, heating element 306 includes a plurality of superconducting heat transfer tubes 402 that are arranged to form a panel 404. Exemplary heat transfer tubes 402 include, but are not limited to only including, Qu Tubes commercially available from New Qu Energy Ltd., Hong Kong, China. Moreover, in the exemplary embodiment, a steam source 332 (shown in FIG. 3) channels steam 400 past heat transfer tubes 402, which absorb heat energy from the steam 400. Exhaust gases 406 from gas turbine engine 106 are channeled through heat transfer tubes 402, where exhaust gases 406 absorb at least a portion of the heat energy from heat transfer tubes 402. The steam sources 332 receives steam (shown as a dotted line 410) from at least one heat exchanger (shown in FIG. 3 as either 208 or 304, but can include any heat exchanger upstream of the steam based heating element 306 in the HRSG 116). The steam sources 332 include, but are not limited to only including, a steam turbine (for example the steam turbine 124 shown in FIG. 1), a supplemental boiler, a pressure drum (such as high pressure drum 214, intermediate pressure drum 216, and/or low pressure drum 218 shown in FIG. 2), or any other suitable steam source that is capable of providing steam having sufficient heat energy to heat element 306. Steam exits the steam source 332 and enters the steam based heating element 306 (shown as a dotted line 420).

Figure 5:
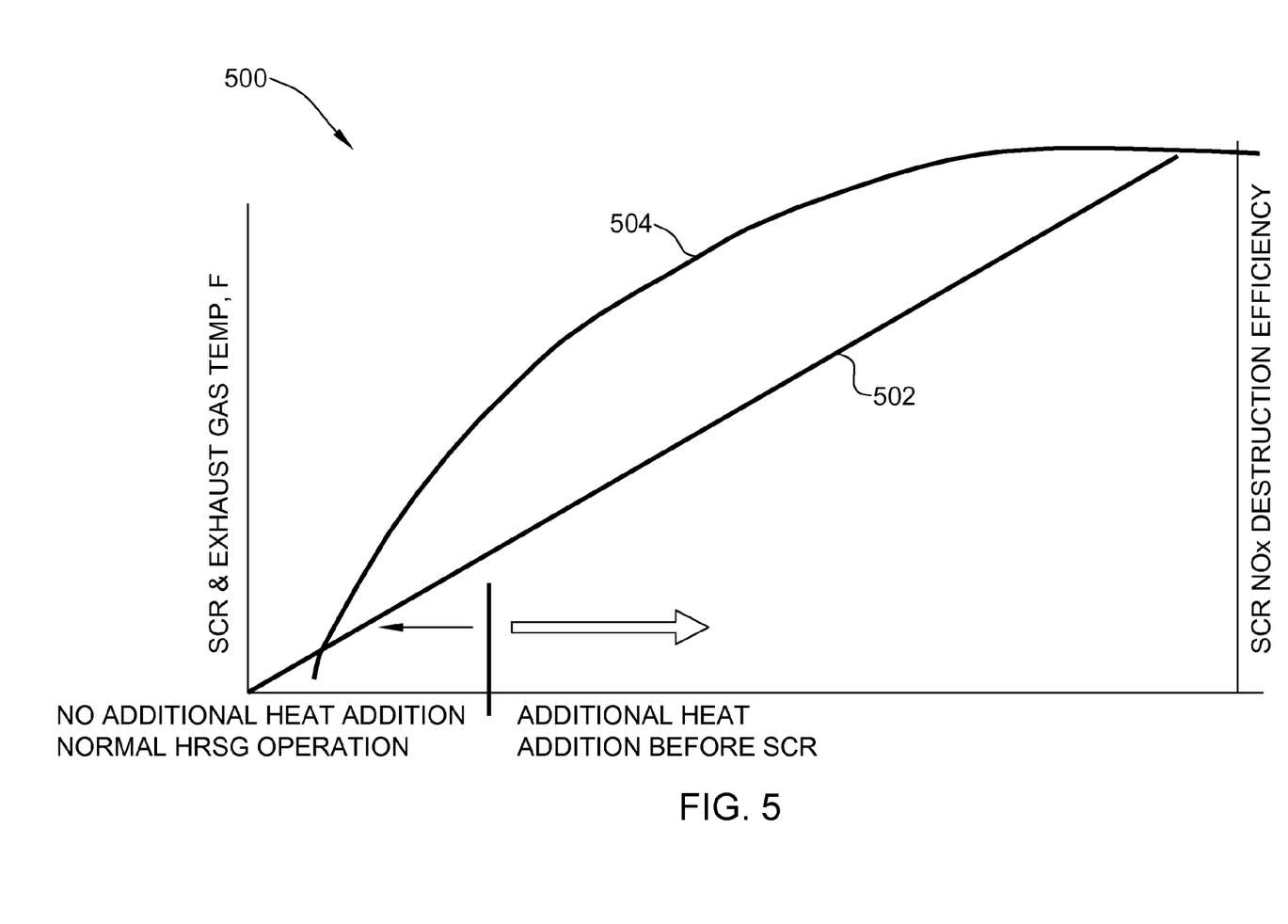
FIG. 5 is a graph that illustrates the efficiency of a $NO_x$ reduction element shown in FIG. 3 over time and based on the temperature of the exhaust gases as the exhaust gases enter the $NO_x$ reduction element.

FIG. 5 is a graph 500 that illustrates the efficiency of NO$_x$ reduction element 312 (shown in FIG. 3) over time and based on the temperature of exhaust gases 406 as exhaust gases 406 enter NO$_x$ reduction element 312. More specifically, graph 500 includes an exhaust gas temperature curve 502 that illustrates the temperature of exhaust gases 406 as they enter NO$_x$ reduction element 312 over time and, in particular, during a start-up or shut down phase of gas turbine engine 106 (shown in FIG. 1) and low load conditions. Graph 500 also includes an effectiveness curve 504 of NO$_x$ reduction element 312 over time and, in particular, during a start-up phase of gas turbine engine 106. As shown in FIG. 5, injection apparatus 310 (shown in FIG. 3) does not begin to inject the reducing agent into the flow of exhaust gases 406 until the catalyst surface temperature reaches a predetermined temperature, such as approximately 400° F. In order to reach a sufficient catalyst surface temperature, controller 316 selectively activates heating element 306 (both shown in FIG. 3) based on a temperature of exhaust gases 406 upstream from heating element 306. When heating element 306 is activated, steam 400 is channeled through heat transfer tubes 402 (shown in FIG. 4), and heat transfer tubes 402 absorb at least a portion of the heat energy from steam 400. Exhaust gases 406 in turn absorb at least a portion of the heat energy from heat transfer tubes 402 as exhaust gases 406 are channeled towards $NO_x$ reduction element 312. When the surface of the catalyst reaches the desired temperature, injection apparatus 310 begins to inject the reaction agent to facilitate increased efficiency of $NO_x$ reduction element 312, as shown via curve 504.

Exemplary embodiments of methods and apparatus for use in reducing emissions, such as $NO_x$ emissions, are described herein. The embodiments described herein facilitate increasing a temperature of exhaust gases from a gas turbine engine by using a duct burner to enhance an ability of a selective catalytic reduction (SCR) element to reduce the concentration of $NO_x$ of the exhaust gases emitted into the atmosphere via an exhaust stack. Moreover, during gas turbine engine start up, shut down, and at lower load conditions, normal HRSG operating method would result in exhaust gas temperatures with low $NO_x$ destruction efficiencies at the SCR entrance. Accordingly, the embodiments described herein direct heat energy to a heat exchanger upstream of the SCR to provide the required $NO_x$ destruction efficiency. The amount of heat energy is controlled to minimize plant efficiency.

Exemplary embodiments of systems, apparatus, and methods of assembly are described above in detail. The systems, apparatus, and methods of assembly are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A controller, such as those described herein, includes at least one processor or processing unit and a system memory. The controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a heat recovery steam generator (HRSG) with at least one $NO_x$ reduction catalyst for use with a gas turbine engine, said method comprising:
   heating a fluid in at least one heat exchanger that receives a flow of exhaust gases discharged from the gas turbine engine such that the at least one heat exchanger generates steam as a result of being heated by the flow of exhaust gases;
   reducing a temperature of the steam by at least one steam tube downstream from the at least one heat exchanger that receives the flow of exhaust gases from the at least one heat exchanger, such that the at least one steam tube is heated via a flow of the steam discharged from the at least one heat exchanger and transfers heat from the flow of the steam into the flow of exhaust gases;
   heating the flow of exhaust gases by the at least one steam tube to a temperature of between about 500° F. to about 800° F.; and
   reducing the $NO_x$ by the at least one $NO_x$ reduction catalyst downstream from the at least one steam tube to receive the flow of exhaust gases from the at least one steam tube,
   wherein during operation of the HRSG the flow of exhaust gases is cooled by the at least one heat exchanger and then heated by the at least one steam tube before being $NO_x$ reduced by the at least one $NO_x$ reduction catalyst.

2. The method in accordance with claim 1, further comprising injecting a reducing agent into the flow of exhaust gases by an injection apparatus located downstream from the at least one steam tube and upstream from the at least one $NO_x$ reduction catalyst.

3. The method in accordance with claim 1, further comprising controlling the at least one steam tube by a controller, wherein the controller selectively activates the at least one steam tube in response to a temperature of the flow of exhaust gases upstream from the at least one steam tube.

4. The method in accordance with claim 3, wherein the controller selectively activates the at least one steam tube during at least one of gas turbine startup, gas turbine shut down, and gas turbine low load operation.

5. The method in accordance with claim 1, further comprising coupling the at least one steam tube to a steam turbine to receive the flow of steam across the steam turbine.

6. A heat recovery steam generator (HRSG) coupled to a gas turbine engine that discharges a flow of exhaust gases including oxides of nitrogen ($NO_x$), said HRSG comprising:
   at least one heat exchanger coupled downstream from the gas turbine engine to receive the flow of exhaust gases from the gas turbine engine such that said at least one heat exchanger generates steam as a result of being heated by the flow of exhaust gases;

at least one steam tube coupled downstream from said at least one heat exchanger, wherein said at least one steam tube receives the flow of exhaust gases from said at least one heat exchanger such that said at least one steam tube is heated via a flow of steam discharged from said at least one heat exchanger and transfers heat from the flow of steam into the flow of exhaust gases;

the at least one steam tube facilitates heating the flow of exhaust gases to a temperature of between about 500° F. to about 800° F.; and at least one $NO_x$ reduction catalyst coupled downstream from said at least one steam tube to receive the flow of exhaust gases from said at least one steam tube and facilitate reducing an amount of $NO_x$ in the flow of exhaust gases, wherein during operation of said HRSG the flow of exhaust gases is cooled by said at least one heat exchanger, then heated by said at least one steam tube, and then $NO_x$ reduced by said at least one $NO_x$ reduction catalyst.

7. The HRSG in accordance with claim 6, wherein said at least one steam tube is selectively activated in response to a temperature of the exhaust gases upstream from said at least one steam tube.

8. The HRSG in accordance with claim 6, wherein said at least one steam tube facilitates heating the flow of exhaust gases during at least one of a startup phase, a shut down phase, and a low load operation phase.

9. The HRSG in accordance with claim 6, wherein said at least one steam tube comprises at least one superconducting heat transfer tube.

10. The HRSG in accordance with claim 6, wherein said at least one steam tube is coupleable to a steam turbine to receive the flow of steam across the steam turbine for use in heating the flow of exhaust gases.

11. The HRSG in accordance with claim 6, wherein said at least one steam tube facilitates heating the flow of exhaust gases to a temperature above a catalyst light off temperature.

12. The HRSG in accordance with claim 6, said HRSG further comprising an injection apparatus coupled downstream from said at least one steam tube and upstream from said at least one $NO_x$ reduction catalyst.

13. A combined cycle power plant comprising:

a gas turbine engine that combusts a fuel in air to produce shaft power and a flow of exhaust gases including oxides of nitrogen ($NO_x$); and a heat recovery steam generator (HRSG) coupled in flow communication with said gas turbine engine, said HRSG comprising:

at least one heat exchanger coupled to said gas turbine engine to receive the flow of exhaust gases from said gas turbine engine such that said at least one heat exchanger generates steam as a result of being heated by the flow of exhaust gases;

at least one steam tube coupled downstream from said at least one heat exchanger, wherein said at least one steam tube receives the flow of exhaust gases from said at least one heat exchanger such that said at least one steam tube is heated via a flow of steam discharged from said at least one heat exchanger and transfers heat from the flow of steam into the flow of exhaust gases;

the at least one steam tube facilitates heating the flow of exhaust gases to a temperature of between about 500° F. to about 800° F.; and at least one $NO_x$ reduction catalyst coupled downstream from said at least one steam tube to receive the flow of exhaust gases from said at least one steam tube and facilitate reducing an amount of $NO_x$ in the flow of exhaust gases, wherein during operation of said HRSG the flow of exhaust gases is cooled by said at least one heat exchanger, then heated by said at least one steam tube, and then $NO_x$ reduced by said at least one $NO_x$ reduction catalyst.

14. The combined cycle power plant in accordance with claim 13, further comprising a controller that selectively facilitates activating said at least one steam tube in response to a temperature of the flow of exhaust gases upstream from said at least one steam tube.

15. The combined cycle power plant in accordance with claim 13, wherein said at least one steam tube facilitates heating the flow of exhaust gases to a temperature above a catalyst light off temperature.

16. The combined cycle power plant in accordance with claim 13, wherein said at least one steam tube facilitates heating the flow of exhaust gases during a transient operation phase of said combined cycle power plant.

17. The combined cycle power plant in accordance with claim 13, further comprising a steam turbine, wherein said at least one steam tube is coupled to said steam turbine to facilitate receiving the flow of steam across said steam turbine for use in heating the flow of exhaust gases.

18. The combined cycle power plant in accordance with claim 13, wherein said HRSG further comprises an injection apparatus coupled downstream from said at least one steam tube and upstream from said at least one $NO_x$ reduction catalyst, wherein said injection apparatus facilitates injecting a reducing agent into the flow of exhaust gases to facilitate NOx reduction reactions.

* * * * *